March 25, 1969 C. E. ATKINS ET AL 3,435,298

CONDITION RESPONSIVE CIRCUIT

Filed Oct. 18, 1965

INVENTOR
CARL E ATKINS
ROBERT L. ZIOLKOWSKI
BY
Eyre, Mann, & Lucas
ATTORNEYS 3,435,298
CONDITION RESPONSIVE CIRCUIT

Carl E. Atkins, Montclair, and Robert L. Ziolkowski, South Plainfield, N.J., assignors, by mesne assignments, to Wagner Electric Corporation, South Bend, Ind., a corporation of Delaware Filed Oct. 18, 1965, Ser. No. 496,821
Int. Cl. H01h 47/12, 47/32
U.S. Cl. 317—146 9 Claims

ABSTRACT OF THE DISCLOSURE

Two condition-responsive circuits are disclosed which are operative to energize a load for a predetermined length of time after sensing both the presence and subsequent absence of an input signal of a predetermined magnitude. The condition responsive circuits each comprise a low-frequency relaxation oscillator, an electromagnetic relay, a controlled shunt path for the winding of the relay, and an RC timing circuit.

This invention relates to a condition responsive circuit which is sensitive to small changes in capacity. The present invention has particular reference to a circuit which is controlled by the capacity of the body. Touching a conductive electrode produces circuit changes and thereby applies an output voltage to a load circuit.

Many forms of capacity controlled circuits have been developed and used. Many of these depend upon high frequency generators using special vacuum tube triodes. Other circuits require expensive high frequency transmission lines and other high frequency components which are difficult to adjust and maintain. The present invention does not use vacuum tubes and employs a type of relaxation oscillator with a gas filled diode as the oscillation element. The oscillator generates two normally balanced output signals which are applied to an operating circuit having special features.

One of the objects of this invention is to provide an improved condition responsive circuit which avoids one or more of the disadvantages and limitations of prior art arrangements.

Another object of the invention is to operation an output circuit when a portion of the body, such as a hand, makes contact with a conductive electrode.

Another object of the invention is to continue the operation of the output circuit until a desired sequence of operations is ended.

Another object of the invention is to reduce the cost and the complexity of condition responsive circuits.

Another object of the invention is to prevent initiation of the desired sequence of operations until a sequence is finished.

Another object of the invention is to provide fail-safe circuits and devices which act to protect the components used.

The invention includes a type of relaxation oscillator connected directly to an alternating current power source. The oscillator generates two output voltage waves which are coupled to a summation circuit. The summation circuit normally produces no output voltage but when a conductive electrode has its capacity altered, the oscillator characteristics are changed and the summation circuit applies a voltage to a semiconductor switching circuit. A load circuit, which may include a motor, is connected to the output of the switching circuit and is operated when the switching circuit becomes conductive. At the end of the operating sequence, which includes the motor operation, the circuit is normalized.

For a better understanding of the present invention, together with other and further objects thereof, reference is made to the following description taken in connection with the accompanying drawings.

Figure 1:
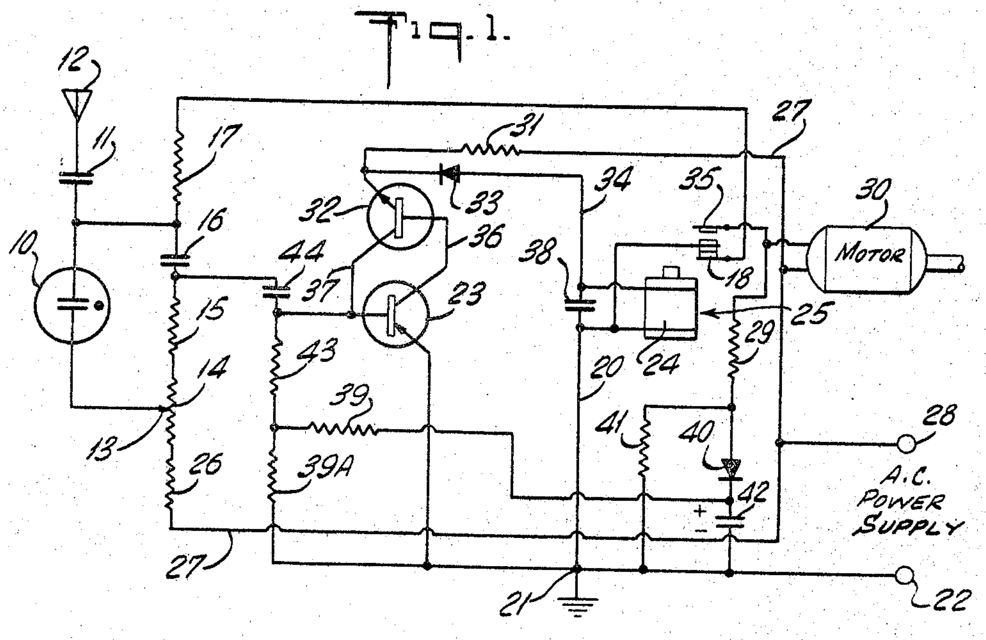
FIG. 1 is a schematic diagram of connections showing one form of the invention.

Referring now to FIG. 1, the circuit includes a neon lamp 10, including two conductive electrodes and a gas at a reduced pressure within a sealed envelope. One of the lamp electrodes is connected to a series capacitor 11 and an antenna 12 which in this case may be an electrode placed in a convenient position where it may be touched by a portion of the body of an individual. The other terminal of lamp 10 is connected to a movable contact 13 which may be moved along a resistor 14. A portion of this resistor is connected in series with another resistor 15 and a second capacitor 16, these elements being bridged across the lamp electrodes.

The junction of capacitor 16 and lamp 10 is connected to a series circuit which includes a resistor 17, relay contacts 18, conductor 20, a ground connection 21, and one terminal 22 of an alternating current power supply. Conductor 20 is also connected to the emitter electrode of a first transistor 23 and to one end of a winding 24 which forms part of a relay 25. The other electrode in lamp 10 is connected through contact 13, the lower portion of resistor 14, a series resistor 26, conductor 27, to the other terminal 28 of the alternating current power supply. Conductor 27 is connected to one terminal of a motor 30 which in this case is the load. Conductor 27 is also connected through a resistor 31 to the emitter of a second transistor 32. The emitter of the second transistor 32 is connected in series with a diode 33 and a conductor 34 to the other end of winding 24. The relay contacts also include a second pair of normally open contacts 35, one side of which is connected to the motor 30. When the relay is deenergized, the motor is connected to terminals 22, 28 for energization by the power supply.

Transistors 23 and 32 are interconnected to form a combination which is similar to a four zone p-n-p-n semiconductor or to a silicon controlled rectifier. The collector of p-n-p transistor 23 is connected to the base of n-p-n transistor 32 while the collector of transistor 32 is connected to the base of transistor 23. This interconnection means provides an operating characteristic similar to a thyratron as will be evident when the operation is discussed. A capacitor 38 is connected across winding 24 of relay 25 in order to maintain the relay energized during the positive half cycle of the voltage wave. The normal operating potential which maintains the transistor combination non-conductive is supplied by a diode 40 connected in series with a resistor 41. This combination is coupled to the power supply terminals 22, 28 through the motor 30 and a high resistor 29 and charges a capacitor 42 to a direct current potential. One side of this capacitor is connected to ground and the emitter of transistor 23 while the other side of capacitor 42 is connected through resistors 39 and 43 to the base of transistor 23, thereby giving it a positive bias to retain the transistor normally non-conductive.

The operation of this circuit is as follows:

As soon as the power supply is connected to terminals 22 and 28, current flows during the negative half cycle of the voltage wave through winding 24 to energize the relay and close contacts 18. The circuit for this actuation may be traced from terminal 22, over conductor 20, through winding 24, over conductor 34, through diode 33, resistor 31, over conductor 27, and back to the other power terminal 28. This current also charges capacitor 38 the discharge of which through winding 24 maintains the relay energized during the positive half cycle of the voltage wave. During the positive half cycle of the voltage wave capacitor 42 is charged through diode 40, resistor 29, and the winding of motor 30.

As soon as contacts 18 are closed, voltage is applied to the oscillating circuit which includes the lamp 10, the chargeable capacitor 16, and resistors 14, 15 and 26. The lower end of resistor 26 is connected directly to terminal 28 by conductor 27 while the upper end of resistor 17 is connected through normally closed contacts 18, conductor 20, and ground connection 21 to the other terminal 22. This arrangement is a relaxation oscillator and the values of the capacitor and resistors are such that the frequency of oscillation is within the range of 2,000 to 4,000 cycles per second. Capacitor 16 first charges to a potential which is equal to the firing potential of the lamp. During this time capacitor 44 also charges. Then, when the lamp is lighted and takes current, the voltage is reduced to the lamp operating value during which time capacitors 16 and 44 discharge. At this time the voltage across the lamp is not sufficient to maintain it in a lighted condition so that the lamp goes out and the cycle starts again. It should be noted that this type of oscillator works equally well with a positive or negative voltage applied to its terminals and therefore it operates on both parts of the alternating wave.

The output of this oscillator is applied through a series capacitor 44 to the base of transistor 23 (also to the collector of transistor 32). A second output connection can be traced from the upper end of resistor 17, through contacts 18 to the emitter of transistor 23. Under normal oscillating conditions contact 13 on resistor 14 is adjusted so that the alternating current voltage supplied between the base of transistor 23 and contact 13 is equal and opposite to the voltage across resistor 17. For this reason, the two output voltages cancel each other and there is no potential applied across the base-emitter electrodes of transistor 23.

Now let it be assumed that the capacity of antenna 12 is increased considerably. This may occur when a portion of the body comes in contact with the antenna 12. This increases the magnitude of the pulses impressed through capacitor 44 and during the negative half cycle applies a negative potential to the base of transistor 23 sufficient to overcome the bias voltage. Transistor 23 thereupon conducts during each negative half cycle of the AC power supply. Current then flows from the emitter to the collector of transistor 23 and over conductor 36 to the base of transistor 32, making it conductive also. This action applies a negative voltage to the collector of transistor 32 which is transmitted over conductor 37 to the base of transistor 23, thereby maintaining it in a conductive condition for the duration of the half cycle. It should be noted that this conductive condition of the two transistors will be maintained during the half cycle period even though the capacity of antenna 12 is returned to its normal value.

When the negative current pulses flow through the two transistors, relay 25 is normalized by the shunting action of the transistor combination, contacts 18 are opened, and contacts 35 are closed. The oscillator circuit is opened at contacts 18. Motor 30 is now started since contacts 35 are connected between one of the motor terminals and terminal 22 of the power supply. The other motor terminal is permanently connected to power terminal 28. When the combination transistor circuit 23, 32 is conductive, current is shunted past the coil 24 during the time terminal 28 is negative with respect to ground. When terminal 28 is positive with respect to ground, current to the relay coil 24 is blocked by diode 33.

During the time the oscillator circuit applies a series of negative pulses to the base of transistor 23, both transistors conduct and capacitor 42 is partly discharged through resistors 39 and 39A. When the relaxation oscillator stops oscillating, the base of transistor 23 remains at its conductive potential until capacitor 42 is charged again. By the proper selection of values for resistors 39 and 39A, and capacitor 42, a desired delay action (such as 5 seconds) may be obtained and the motor 30 kept running for this period. When the capacitor 42 is again charged, the potential of the base of transistor 23 is raised to its normal cut-off value and the shunt around the relay winding is removed. When current again flows through the winding 24 and contacts 18 are closed, the motor is cut off, the oscillating circuit which includes lamp 10 and capacitor 16 is supplied with power, and the operating cycle is complete.

Figure 2:
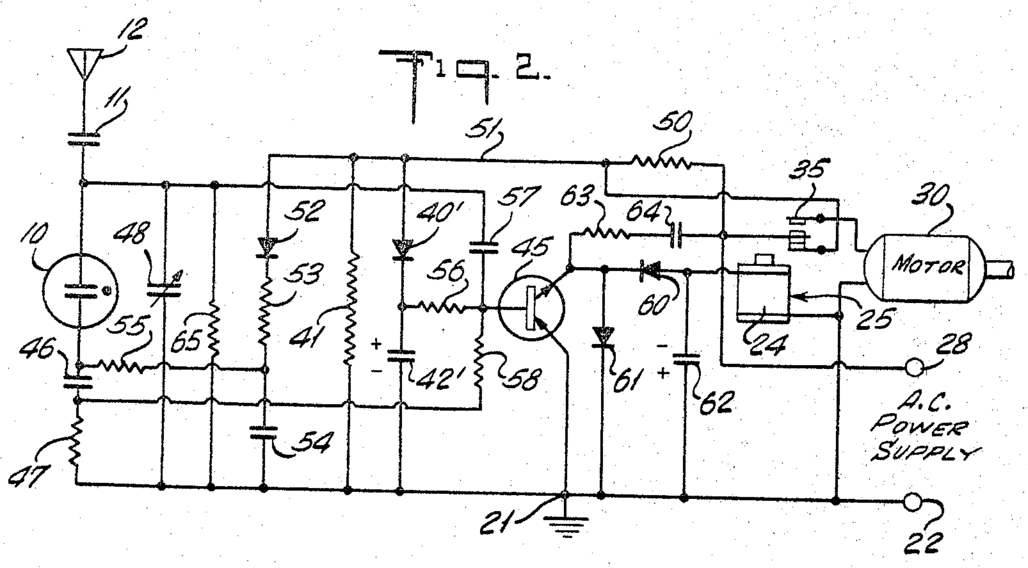
FIG. 2 is a schematic diagram similar to FIG. 1 but showing another form of the invention.

The circuit shown in FIG. 2 is similar to the circuit of FIG. 1 since it has an oscillating circuit including a lamp 10, a semiconductor switching device 45 (equivalent to combination 23, 32), a relay 25 having an armature normally actuated, and a motor 30. The oscillating circuit includes a neon lamp 10, a series chargeable capacitor 48, and series resistors 53 and 55. Antenna 12 is coupled to the oscillator circuit through the small capacitor 11.

Alternating current power for operating the circuit is applied to terminals 22 (ground) and 28. Terminal 28 is connected to the common contact of relay 25 and to a resistor 50 which is shunted when contacts 18 are closed as shown in the drawing. The power supply terminal 28 is also connected to a series circuit which includes resistor 50, conductor 51, a first diode 52, resistor 53, a capacitor 54, and the other power terminal 22. Power for the oscillating circuit is fed through resistor 55 to the junction of lamp 10 and a capacitor 46.

The semiconductor switching component 45 is similar to the double transistor arrangement 23, 32 shown in FIG. 1. It has the same characteristics as the transistor circuit. The component 45 has four layers and three lead-in conductors. It is normally biased for non-conduction by a bias circuit which includes a diode 40' and a capacitor 42'. The alternating voltage applied to diode 40' over conductor 51 charges capacitor 42' and a positive bias is applied to the base of the semiconductor switch 45 through resistor 56 maintain the switch normally non-conductive.

As before, two alternating current outputs are derived from the oscillator circuit. These outputs are applied to a summation circuit which includes a small capacitor 57 and resistors 58 and 47. The values of these components is selected so that, under normal conditions, no voltage is applied from the oscillator circuit across the base and emitter of switch 45.

The output circuit of switch 45 is applied to a rectifier circuit and the winding 24 of relay 25. The rectifier circuit includes two diodes 60 and 61 shunted by a capacitor 62. The output emitter of switch 45 is also connected to power terminal 28 in series with a limiting resistor 63 and a capacitor 64.

The operation of this circuit is as follows:

When the power is first applied to terminals 22 and 28, during the negative half cycle of the voltage wave, current is supplied to winding 24 of relay 25 causing it to actuate its armature, open contacts 35, and close contacts 18. This operating circuit may be traced from terminal 28 through capacitor 64, resistor 63, diode 60 and winding 24 to the other power terminal 22 and ground. This current also charges capacitor 62 which maintains the relay energized during the positive half cycle of the voltage wave. During the positive half cycle of the voltage wave, current is supplied to the lamp 10 over a circuit which may be traced as follows: from terminal 28 through closed contacts 18, over conductor 51, through diode 52, resistors 53 and 55, through lamp 10, and resistor 65 to the other power terminal 22. During each positive half cycle of each voltage wave, the voltage across the lamp 10 approaches the breakdown potential, soon exceeding it and lighting the lamp. The current through the lamp charges capacitor 48 and, as the charge voltage rises, the current drops until it is less than the sustaining current of the lamp. The lamp then goes out and capacitor 48 discharges through parallel resistor 65. The discharge current through resistor 65 continues until the voltage across the lamp 10 exceeds the breakdown potential of the lamp and the lamp again conducts. This action produces a positive sawtooth voltage wave at the junction of lamp 10 and condenser 48 which is applied through capacitor 57 as a series of positive pulses to the base of switch 45 and a negative sawtooth voltage wave at the junction of lamp 10 with resistor 55 which is applied through condenser 46 and resistor 58 as a series of negative pulses to the base of switch 45. Capacitors 57 and 46 block the low frequency components of the voltage wave. Capacitor 48 is so adjusted that the signal applied to the base of switch 45 when the antenna 12 is not touched is a null output voltage. At the same time, current through conductor 51 and through diode 40′ charges capacitor 42′ to a positive potential with respect to ground. This charge is applied to the base of switch 45 and makes it non-conductive.

When the antenna 12 is contacted by a portion of the body, its capacity is changed considerably and the magnitude of the positive train of pulses is reduced. The negative pulses applied through resistor 58 then drive the base of switch 45 negative causing it to conduct and thereby shunt current around the winding 24 during the negative half cycle of the voltage wave. Diode 61 shunts the relay winding during the positive half-cycle of the voltage wave. The armature of the relay 25 then opens contacts 18 and closes contacts 35. When contacts 18 are opened the shunt circuit around resistor 50 is opened and resistor 50 is thereby connected in series with the supply circuit to the lamp oscillator, reducing its applied voltage so that it cannot oscillate. When contacts 35 are closed, a circuit to the motor is completed and the motor is operated for a short time interval.

The semiconductor switch 45 is normally held in its non-conductive condition by the charge on capacitor 42′. When the switch is made conductive by the application of negative pulses through resistor 58, contacts 18 are opened, as described above, and resistor 50 is switched into the supply circuit. The potential of the base of switch 45 is reduced and capacitor 42 is partly discharged through resistors 58 and 47. The switch is retained in its conductive condition until capacitor 42 is again charged to its full potential through resistor 50 and diode 40′. By the proper selection of circuit values the conduction period may range from one-half a second to about twenty seconds. At the end of the conduction period, current through winding 24 is again available, contacts 35 are opened, contacts 18 are closed, resistor 50 is shorted, and the operating cycle is complete.

Two embodiments of the invention have been described, one with an oscillator having a lamp and a capacitor connected in parallel. The other embodiment includes an oscillator having a lamp and a capacitor connected in series. The circuit as shown in FIG. 1 includes a double transistor arrangement while FIG. 2 includes a single four zone semiconductor switch. There are other minor differences between the two circuits but they both produce the same result and are both actuated by the same means. The repetition rate of the oscillator pulses may be chosen within the range of two to four kilocycles. When this frequency is used, the oscillators do not affect radio or television reception to any material extent.

Many advantages of the present invention will be apparent to those skilled in the art. Changes can be made in each of the embodiments shown without departing from the spirit and scope of the invention. Therefore, it should be understood that the present invention is not to be limited to the specific embodiments disclosed but is to be determined by the scope of the accompanying claims.

We claim:

1. A condition responsive circuit comprising: an oscillator comprising a plurality of resistors, at least one capacitor, and a voltage breakdown element, said oscillator being operative to generate pulses of similar wave form and opposite polarity when connected to a source of AC power; a normally non-conductive switching element including a control electrode; circuit means for applying the sum of said pulses to said control electrode of said switching element, said switching element being rendered conductive when the sum of said pulses exceeds a predetermined voltage level; an electrode coupled to said oscillator for varying the relative magnitudes of said pulses when the capacitance of the electrode is altered; a relay including a winding, an armature, and two pairs of contacts, said winding being normally energized when connected to a source of AC power and being coupled to the output of the switching element for de-energizing the relay when the switching element is conductive; circuit means operative when the switching element is conductive to suppress oscillation of the oscillator; means for maintaining the switching element conductive for a predetermined period after oscillations of the oscillator are suppressed; and a load circuit to be connected to a source of AC power in series with one of the pairs of contacts for energization when the semiconductor element is conductive.

2. A circuit as claimed in claim 1 wherein said voltage breakdown element is a lamp including two electrodes in an envelope filled with gas at a reduced pressure.

3. A circuit as claimed in claim 1 wherein said output signals are trains of unidirectional electrical pulses.

4. A circuit as claimed in claim 1 wherein said voltage breakdown element is shunted by a capacitor and a resistor in series.

5. A circuit as claimed in claim 1 wherein said voltage breakdown element is connected in series with a capacitor and a resistor.

6. A circuit as claimed in claim 1 wherein said semiconductor switching element is a four layer, three terminal NPNP switch.

7. A circuit as claimed in claim 1 wherein said semiconductor switching element is a combination of an NPN transistor and a PNP transistor.

8. A circuit as claimed in claim 7 wherein the base of the PNP transistor is connected to the collector of the NPN transistor and the base of the NPN transistor is connected to the collector of the PNP transistor.

9. A circuit as claimed in claim 1 wherein said means for maintaining said switching element conductive for a predetermined period after oscillations of said oscillator are suppressed comprises a capacity which, when charged, applies a bias voltage to the control electrode of said switching device and which discharges during said predetermined period.

References Cited

UNITED STATES PATENTS 3,275,897 9/1966 Atkins ---------- 317—146

LEE T. HIX, *Primary Examiner.*

U.S. Cl. X.R.

307—252, 255, 308; 317—148.5; 318—445, 484